(12) United States Patent
Peuhkurinen et al.

(10) Patent No.: US 11,495,194 B1
(45) Date of Patent: Nov. 8, 2022

(54) DISPLAY APPARATUSES AND METHODS INCORPORATING PATTERN CONVERSION

(71) Applicant: Varjo Technologies Oy, Helsinki (FI)

(72) Inventors: Ari Antti Erik Peuhkurinen, Helsinki (FI); Klaus Melakari, Espoo (FI); Perttu Keinänen, Turku (FI); Oiva Arvo Oskari Sahlsten, Salo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/398,057

(22) Filed: Aug. 10, 2021

(51) Int. Cl.
*G09G 5/38* (2006.01)
*G06F 3/01* (2006.01)
*G09G 5/10* (2006.01)
*G02B 26/10* (2006.01)
*G02B 26/08* (2006.01)
*G09G 3/00* (2006.01)

(52) U.S. Cl.
CPC .......... *G09G 5/38* (2013.01); *G02B 26/0833* (2013.01); *G02B 26/10* (2013.01); *G06F 3/013* (2013.01); *G09G 3/002* (2013.01); *G09G 5/10* (2013.01); *G09G 2340/0407* (2013.01); *G09G 2354/00* (2013.01)

(58) Field of Classification Search
CPC .............................................. G09G 2340/0407
See application file for complete search history.

(56) References Cited

U.S. PATENT DOCUMENTS

2019/0293853 A1\* 9/2019 Ayres .................. G02B 5/1819

\* cited by examiner

*Primary Examiner* — Gustavo Polo
(74) *Attorney, Agent, or Firm* — Ziegler IP Law Group, LLC

(57) ABSTRACT

A display apparatus comprising: first light source(s) per eye, scanning mirror(s) per eye, pattern converting element per eye, and processor(s) configured to control first light source(s) to emit a light beam, whilst controlling scanning mirror(s) to draw subframe(s) of first image frame over pattern converting element, wherein subframe(s), when drawn, comprises plurality of light spots arranged in first pattern, wherein pattern converting element is employed to direct light beam incident thereon towards target surface, whilst converting first pattern of plurality of light spots into second pattern, thereby producing on target surface output image having spatially-variable resolution.

22 Claims, 5 Drawing Sheets

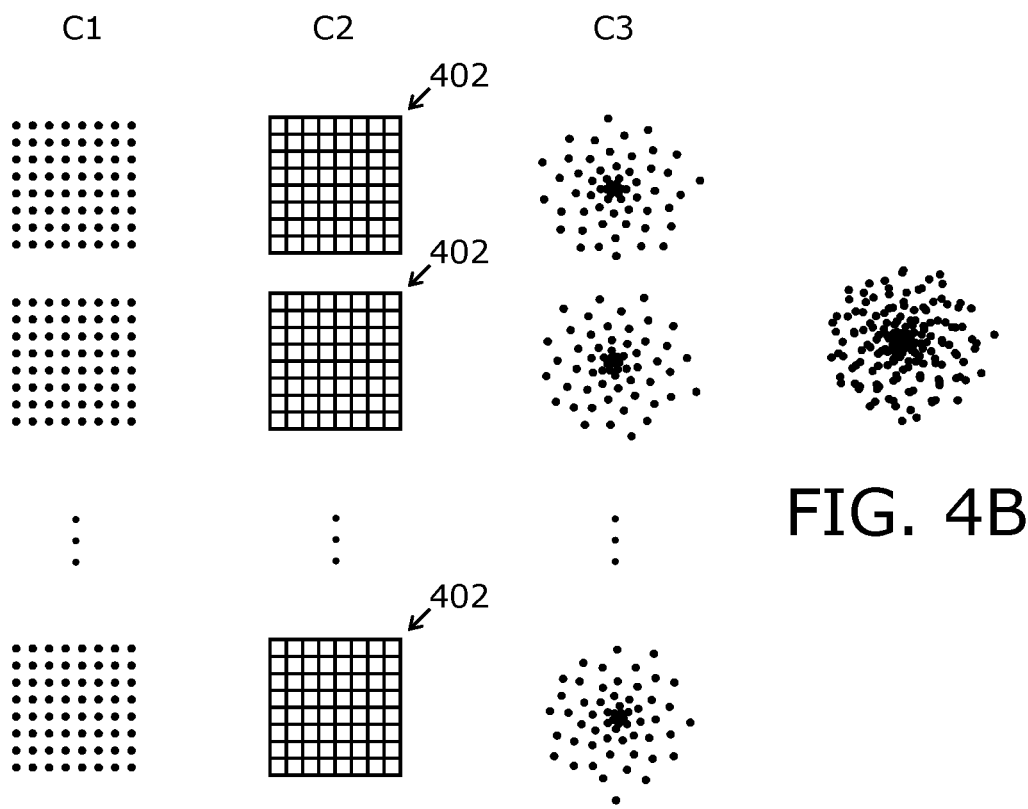
FIG. 4A
FIG. 4B
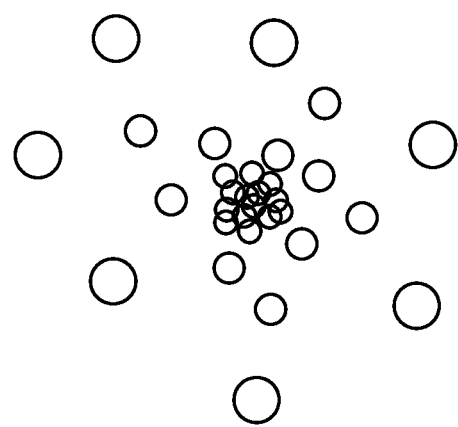
FIG. 5

DISPLAY APPARATUSES AND METHODS INCORPORATING PATTERN CONVERSION

TECHNICAL FIELD

The present disclosure relates to display apparatuses incorporating pattern conversion. The present disclosure also relates to methods of displaying implemented via such display apparatuses.

BACKGROUND

In recent times, continuous advancements in display technology have been and are being made to improve display capabilities of a display apparatus (for example, a head-mounted display (HMD), a television, a computer, a smartphone, a projection device, and the like), in order to present high-resolution images to a user of the display apparatus. Such advancements are especially critical in case of evolving technologies such as immersive extended-reality (XR) technologies which are being employed in various fields such as entertainment, real estate, training, medical imaging operations, simulators, navigation, and the like.

However, existing display apparatuses have several limitations associated therewith. Some existing display apparatuses employ light sources (displays or projectors) with grid-like patterns of pixels, that are arranged at fixed positions within display apparatuses. These display apparatuses are limited in their capabilities to dynamically render complex projection patterns of images. In such instances, the images shown to the users of the display apparatuses are suboptimal as they do not emulate image viewing quality and characteristics of human visual system, thereby providing poor viewing experiences to the users. Moreover, some existing display apparatuses provide foveation-based rendering of the complex projection patterns, by employing a large number of moving components (such as lenses, mirrors, projectors, and the like). The movements of such a large number of components within the display apparatuses are complex and need considerable space, thereby making the display apparatuses bulky.

Therefore, in light of the foregoing discussion, there exists a need to overcome the aforementioned drawbacks associated with existing display apparatuses.

SUMMARY

The present disclosure seeks to provide a display apparatus incorporating pattern conversion. The present disclosure also seeks to provide a method of displaying implemented via such display apparatus. An aim of the present disclosure is to provide a solution that overcomes at least partially the problems encountered in prior art.

In one aspect, an embodiment of the present disclosure provides a display apparatus comprising:
at least one first light source per eye;
at least one scanning mirror per eye;
a pattern converting element per eye; and
at least one processor configured to control the at least one first light source to emit a light beam, whilst controlling the at least one scanning mirror to draw at least one subframe of a first image frame over the pattern converting element, wherein the at least one subframe, when drawn, comprises a plurality of light spots arranged in a first pattern,
wherein the pattern converting element is employed to direct the light beam incident thereon towards a target surface, whilst converting the first pattern of the plurality of light spots into a second pattern, thereby producing on the target surface an output image having a spatially-variable resolution.

In another aspect, an embodiment of the present disclosure provides a method of displaying, the method comprising:
controlling at least one first light source to emit a light beam, whilst controlling at least one scanning mirror to draw at least one subframe of a first image frame over a pattern converting element, wherein the at least one subframe, when drawn, comprises a plurality of light spots arranged in a first pattern; and
employing the pattern converting element to direct the light beam incident thereon towards a target surface, whilst converting the first pattern of the plurality of light spots into a second pattern, thereby producing on the target surface an output image having a spatially-variable resolution.

Embodiments of the present disclosure substantially eliminate or at least partially address the aforementioned problems in the prior art, and enable presentation of output images having spatially-variable resolution, such output images being produced using pattern conversion.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4A illustrates how a pattern converting element converts first patterns of light spots constituting subframes of a first image frame into second patterns, while FIG. 4B illustrates a perceived arrangement of light spots of an output image, in accordance with an embodiment of the present disclosure;

FIG. 5 illustrates a simplified exemplary arrangement of perceived light spots of an output image, in accordance with an embodiment of the present disclosure;

FIG. 7A illustrates an exemplary scanning pattern according to which a scanning mirror sweeps a light beam over a pattern converting element, while

Figure 1:
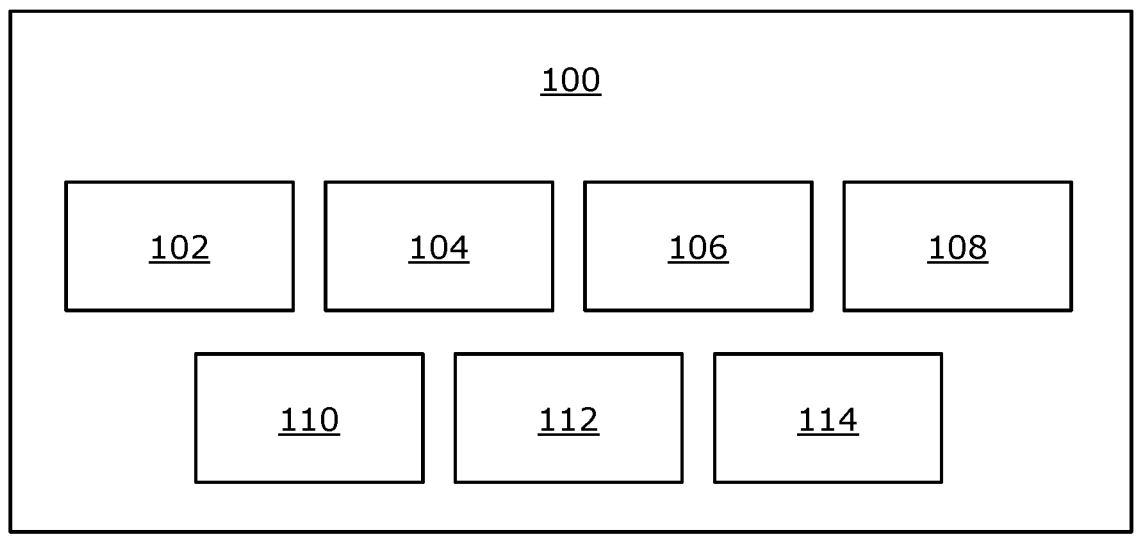
FIGS. 1 and 2 illustrate architectures of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
at least one first light source per eye;
at least one scanning mirror per eye;
a pattern converting element per eye; and
at least one processor configured to control the at least one first light source to emit a light beam, whilst controlling the at least one scanning mirror to draw at least one subframe of a first image frame over the pattern converting element, wherein the at least one subframe, when drawn, comprises a plurality of light spots arranged in a first pattern,
wherein the pattern converting element is employed to direct the light beam incident thereon towards a target surface, whilst converting the first pattern of the plurality of light spots into a second pattern, thereby producing on the target surface an output image having a spatially-variable resolution.

In another aspect, an embodiment of the present disclosure provides a method of displaying, the method comprising:
controlling at least one first light source to emit a light beam, whilst controlling at least one scanning mirror to draw at least one subframe of a first image frame over a pattern converting element, wherein the at least one subframe, when drawn, comprises a plurality of light spots arranged in a first pattern; and
employing the pattern converting element to direct the light beam incident thereon towards a target surface, whilst converting the first pattern of the plurality of light spots into a second pattern, thereby producing on the target surface an output image having a spatially-variable resolution.

The present disclosure provides the aforementioned display apparatus and the aforementioned method of displaying. Herein, the display apparatus employs the pattern converting element to effectively convert the first pattern of light spots (which is a simple projection pattern) into a second pattern (which is a complex foveation-based projection pattern) whilst directing the light beam towards the target surface. Consequently, the output image having the spatially variable resolution is produced on the target surface (in real time or near real time). Beneficially, the output images produced in this manner are optimal and emulate image viewing quality and characteristics of human visual system, thereby providing improved viewing experience to a user of the display apparatus. Moreover, the display apparatus employs a minimal number of moving parts to produce complex projection patterns of light spots in the output images. Therefore, the display apparatus employs a simple arrangement of its components, is compact and is lightweight. The display apparatus provides large angle high-resolution foveated rendering of the output images, using the minimal number of movable and small-sized components. The method is fast, reliable and can be implemented with ease.

Throughout the present disclosure, the term "display apparatus" refers to a display device that is capable of displaying output images. Examples of the display apparatus include, but are not limited to, a head-mounted display (HMD), a projection device (such as a projector), a television, a desktop computer, a laptop computer, a tablet computer, a phablet, a smartphone, a smartwatch, and a head-up display (HUD).

Optionally, the display apparatus is implemented as the HMD. The term "head-mounted display" refers to a specialized equipment that is configured to present an extended-reality (XR) environment to a user when the HMD, in operation, is worn by the user on his/her head. The HMD is implemented, for example, as an XR headset, a pair of XR glasses, and the like, that is operable to display a visual scene of the XR environment to the user. The visual scene is optionally constituted by the output image. The term "extended-reality" encompasses virtual reality (VR), augmented reality (AR), mixed reality (MR), and the like.

Notably, the at least one processor controls overall operation of the display apparatus. In particular, the at least one processor is communicably coupled to and controls operation of the at least one light source, the at least one scanning mirror, and the pattern converting element.

Throughout the present disclosure, the term "light source" refers to an equipment from which light emanates. In particular, the at least one first light source is an equipment that is employed to emit the light beam that eventually produces the output image. The light beam optionally comprises a plurality of light rays. Examples of the at least one first light source include, but are not limited to, a laser diode, a solid-state laser, a synchrotron. It will be appreciated that the at least one first light source emits the light beam towards the at least one scanning mirror. The light beam travels along an optical path in the display apparatus.

Optionally, the at least one first light source comprises a beam modulator that is employed to modulate at least one of: an intensity of the light beam, a width of the light beam, a wavelength of the light beam. The term "beam modulator" refers to a specialized equipment that is configured to modulate at least one property (such as the intensity, the width, the wavelength, and the like) of the light beam. The beam modulator could be implemented by way of a lens, a mechanical shutter, a collimating element (such as a collimating lens, a collimating mirror, and similar), a colour filter, a polarizer, a light absorbing element, and the like. The technical benefit of modulating (namely, changing) the intensity of the light beam is to produce a uniform brightness for a given pixel of the output image. The technical benefit of modulating the width (namely, cross-section) of the light beam is to produce different pixel sizes, thereby enabling in producing a variable resolution in the output image. When the width of the light beam is modulated, a collimated light beam is produced. The technical benefit of modulating the wavelength of the light beam is to produce one of: a monochromatic light beam, a polychromatic light beam, as required.

In some implementations, the display apparatus further comprises at least one second light source, wherein the at least one processor is configured to control the at least one second light source to display a second image frame. Optionally, the at least one second light source is implemented as a display. In this regard, the second image frame is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, the at least one second light source is implemented as a projector. In this regard, the second image frame is projected onto the target surface. Examples of such a projector include, but are not limited to, an LCD-based projector, an LED-based projector, an OLED-based projector, an LCoS-based projector, a Digital Light Processing (DLP)-based projector, and a laser projector. Optionally, the at least one second light source is a multi-resolution light source, or a single-resolution light source. Optionally, a projection of the second image frame is optically combined with a projection of the output image to create a visual scene. Such an optical combination occurs on the target surface itself, or via an optical combiner. The optical combiner could be implemented by way of at least one of: a lens, a mirror, a semi-transparent film, a semi-transparent flexible membrane, a prism, a beam splitter, an optical waveguide, a polarizer. It will be appreciated that a resolution of the second image frame is less than a resolution of the output image (that is produced by drawing the at least one subframe of the first image frame on the target surface). The term "resolution" refers to a pixel density (namely, a number of pixels per unit distance or area or degree) in a given image or a given image frame. Moreover, an angular width of the second image frame is greater than an angular width of the output image. Optionally, the angular width of the second image frame lies in a range of 40-220 degrees, whereas the angular width of the output image lies in a range of 5-60 degrees.

Throughout the present disclosure, the term "scanning mirror" refers to a controllable mirror that is arranged to receive the light beam from the at least one first light source and to direct the light beam (via reflection) towards the pattern converting element, for drawing the at least one subframe over the pattern converting element. The at least one scanning mirror is movable (via tilting, rotation, or similar) in two dimensions, or in three dimensions to direct the light beam towards the pattern converting element. Examples of the at least one scanning mirror include, but are not limited to, a micro-electro-mechanical systems (MEMS) mirror, and a micro-opto-electro-mechanical systems (MOEMS) mirror. It will be appreciated the at least one scanning mirror can be controlled to dynamically draw the at least one subframe for providing, for example, a greater frame rate to a given part of the pattern converting element as compared to other part(s) of the pattern converting element.

It will be appreciated that the at least one scanning mirror is controlled to sweep the light beam over the pattern converting element according to a scanning pattern, for drawing the at least one subframe. The term "scanning pattern" refers to a form (namely, a shape) according to which the light beam is swept over the pattern converting element to draw the at least the subframe. Such a scanning pattern could be a raster pattern, a Lissajous pattern, a spiral pattern, or similar.

Optionally, the at least one scanning mirror is associated with at least one actuator, wherein the at least one processor is configured to control the at least one actuator to move the at least one scanning mirror for sweeping the light beam according to the scanning pattern. Optionally, when moving the at least one scanning mirror, the at least one actuator changes an orientation of the at least one scanning mirror. Optionally, the at least one processor is configured to control the at least one actuator by way of an actuation signal. The actuation signal physically rotates and/or tilts the at least one scanning mirror to change the orientation of the at least one scanning mirror. The actuation signal could be, for example, an electrical signal, a hydraulic signal, a pneumatic signal, or similar. Optionally, the at least one actuator comprises at least one first actuator configured to move the at least one scanning mirror in a first dimension, and at least one second actuator configured to move the at least one scanning mirror in a second dimension. In an example, the at least one first actuator and the at least one second actuator may move the at least one scanning mirror about a horizontal axis (namely, an x-axis) and a vertical axis (namely, a y-axis), respectively. For example, an actuation signal that is used for driving the at least one scanning mirror to sweep the raster pattern may comprise a horizontal actuation signal (for example, such as a sinusoidal signal) and a vertical actuation signal (for example, such as a saw-tooth signal).

Throughout the present disclosure, the term "first pattern" refers to a two-dimensional (2D) arrangement of the plurality of light spots (i.e., how the plurality of light spots are positioned with respect to each other) on the pattern converting element, when the at least one subframe is drawn over the pattern converting element. The plurality of light spots are formed by the plurality of light rays of the light beam, when the light beam is incident over the pattern converting element. The plurality of light spots could be arranged, for example, in a rectangular 2D grid pattern, a polygonal pattern, a circular pattern, an elliptical pattern, a freeform pattern, or similar. The first pattern is formed according to the scanning pattern. As an example, when the scanning pattern is the raster pattern, the first may be the rectangular 2D grid pattern. It will be appreciated that the plurality of light spots could vary in size when the width of the light beam is optionally modulated by the beam modulator.

Throughout the present disclosure, the term "pattern converting element" refers to an element that is arranged to receive the light beam from the at least one scanning mirror and to direct the light beam towards the target surface whilst converting the first pattern into the second pattern. When the pattern converting element directs the light beam towards the target surface, optical paths of the plurality of light rays of the light beam are changed in a manner that when the light beam reaches the target surface, the first pattern of the plurality of light spots is converted (namely, transformed) into the second pattern. In other words, the optical path of the light beam is changed after incidenting upon the pattern converting element such that when the light beam reaches the target surface, the plurality of light spots are arranged in the second pattern on the target surface. Consequently, the output image having the spatially variable resolution is produced on the target surface. The optical path of the light beam is changed due to occurrence of reflection, refraction, and the like, at the pattern converting element.

Optionally, when converting the first pattern into the second pattern, densities and/or sizes of the plurality of light spots are changed. Such change in densities and/or sizes of the plurality of light spots occurs because of how the pattern converting element reflects the light beam towards the target surface. In an example, a size of a given light spot may depend on a length of an optical path of the light beam between the pattern converting element and the target surface. For example, when the length of the optical path of the light beam is high, the size of the given light spot may be big, and vice versa. In another example, a density of the plurality of light spots may depend on directions of the plurality of light rays of the light beam. For example, when the plurality of light rays are directed towards a same area on the target surface, the density of the plurality of light spots in said area may be high.

Throughout the present disclosure, the term "second pattern" refers to a 2D arrangement of the plurality of light spots on the target surface. The second pattern could be a random pattern, a near-random pattern, a concentric pattern, or similar. The plurality of light spots are understood to be light samples formed on the target surface. The plurality of light spots form pixels of the output image. The plurality of light spots arranged in the second pattern constitutes the output image having the spatially-variable resolution. The term "spatially-variable resolution" means that a resolution of the output image varies spatially across the target surface. The at least one subframe (of the first image frame) having the second pattern of the plurality of light spots, is perceived as the output image.

The second pattern is different from the first pattern, the second pattern providing a different spatial resolution than the first pattern. Optionally, a first portion of the second pattern has a higher density of light spots than a second portion of the second pattern. Optionally, in this regard, the first portion of the second pattern corresponds to a higher pixel density in the output image as compared to the second portion of the second pattern. In such a case, the first portion of the second pattern is perceived on the target surface at a higher resolution (thus, with a higher visual acuity) as compared to the second portion of the second pattern. It will be appreciated that such a manner of producing the output image emulates (namely, mimics) image viewing quality and characteristics of human visual system (for example, when the second pattern mimics a human eye resolution pattern). This provides an improved viewing experience to a user of the display apparatus.

Optionally, a central portion of the second pattern has a higher density of light spots than a peripheral portion of the second pattern. In some implementations, the first portion of the second pattern corresponds to the central portion of the second pattern, whereas the second portion of the second pattern corresponds to the peripheral portion of the second pattern. Typically, the user's gaze is assumed to be directed towards a central area of the target surface. Therefore, in such implementations, the display apparatus provides fixed foveated displaying of the output image. In this regard, the central portion of the second pattern is formed on the central area of the target surface, whereas the peripheral portion of the second pattern is formed on a remaining area surrounding the central area of the target surface. In other implementations, the first portion of the second pattern is formed on a gaze-contingent area on the target surface, whereas the second portion of the second pattern is formed on a remaining area surrounding the gaze-contingent area. In the display apparatus, the gaze-contingent area does not necessarily lie at the central area of the target surface but can also lie away from the centre, as the user's gaze changes. Therefore, in such implementations, the display apparatus provides actively foveated displaying of the output image.

It will be appreciated that the display apparatus is capable of producing the output image having the spatially variable resolution when the first image frame has a spatially-uniform resolution. However, in some implementations, the display apparatus is capable of producing the output image having the spatially variable resolution when the first image frame has a variable resolution. In such implementations, the variable resolution of the first image frame is enhanced greatly upon pattern conversion to produce the output image having the spatially variable resolution.

Optionally, the at least one processor is configured to optimise the second pattern according to at least one of: a nose, eyebrows, a given eye, of a user of the display apparatus. This optimisation is performed to provide a required view of the output image. As an example, when optimising the second pattern, the at least one processor may take into account an obstruction that would be caused by the nose of the user when the user would view the output image. As another example, when optimising the second pattern, the at least one processor may take into account an inter-pupillary distance between eyes of the user so as to provide a correct view of the output image on a correct eye of the user. Optionally, when optimising the second pattern, the at least one processor is configured to employ at least one optimising algorithm. Optionally, the at least one optimising algorithm is at least one of: a distortion correction algorithm, an intensity correction algorithm, a colour correction algorithm.

Throughout the present disclosure, the term "target surface" refers to a surface upon which the output image having the spatially-variable resolution is produced. Optionally, the target surface is one of: a projection surface, a retina of an eye of the user, another scanning mirror, an optical element. As an example, the retina of the eye of the user serves as the target surface in case of a direct retinal projection of the output image on the eye of the user. The optical element may be a mirror, a lens, an exit optical element, a focusing element, and the like.

Optionally, the at least one processor is configured to generate the first image frame from an input image, based on a transformation function representing a reverse transformation from the second pattern to the first pattern. When generating the first image frame, the at least one processor takes into account a transition (i.e., the reverse transformation) between the second pattern and the first pattern, this transition being represented by the transformation function. This transition is taken into account as the first pattern is converted into the second pattern by the pattern converting element. Therefore, the first image frame is generated in a manner that when the pattern converting element converts (namely, transforms) the first pattern into the second pattern, the output image is produced in a requisite manner. In that case, visual content in the input image is modified to generate the first image frame, wherein visual content in the first image frame is represented differently as compared to visual content in the output image. As an example, a location of a same pixel may be different in the input image and the first image frame.

In an embodiment, the pattern converting element comprises a plurality of micromirrors that are arranged at different orientations and have different curvatures. It will be appreciated that the different orientations and the different curvatures of the plurality of micromirrors facilitate in changing the optical paths of the plurality of light rays of the light beam in a requisite manner so as to convert the first pattern into the second pattern. This is because the different orientations and the different curvatures of the plurality of micromirrors define directions in which the light beam is reflected and how the light beam is focused (namely, spread) for facilitating in converting the first pattern into the second pattern. The light beam may be reflected and/or focused due to occurrence of planar reflection, convergence, divergence, or similar, from the plurality of micromirrors. The different curvatures of the plurality of micromirrors refer to different surface geometries of the plurality of micromirrors. The different surface geometries could be planar, concave, convex, freeform, and the like. The plurality of micromirrors could have reflective surfaces, wherein the reflective surfaces have the different surface geometries. A given dimension of a given micromirror could be a few micrometres, and a given dimension of the pattern converting element could be a few millimetres. It will be appreciated that the plurality of micromirrors are arranged (namely, positioned or attached) in a required manner (for example, such as a rectangular 2D grid arrangement, a polygonal arrangement, a circular arrangement, an elliptical arrangement, a freeform arrangement, and the like) on the pattern converting element. The rectangular 2D grid arrangement of the plurality of micromirrors is easy to manufacture.

Optionally, the plurality of micromirrors are fixedly arranged at the different orientations on the pattern converting element. In other words, a given micromirror has a fixed orientation when arranged on the pattern converting element. In such a case, each micromirror of the pattern converting element directs the light beam incident thereon towards the target surface, in a fixed manner. It will be appreciated that when the plurality of micromirrors are fixedly arranged, the pattern converting element does not have any movable parts. Beneficially, in such a case, a complex projection pattern of light spots could be accurately produced using a minimal number of moving parts in the display apparatus.

Alternatively, optionally, an entirety of the pattern converting element is movable, wherein the plurality of micromirrors that are fixedly arranged at the different orientations on the pattern converting element. In such a case, the entirety of the pattern converting element can be moved via shifting, tilting, rotation, or similar, to direct the light beam towards the target surface. Optionally, the entirety of the pattern converting element is associated with at least one actuator, wherein the at least one processor is configured to control the at least one actuator to move the entirety of the pattern converting element for directing the light beam towards the target surface. In this regard, the plurality of micromirrors are collectively controlled in a same manner.

Yet alternatively, optionally, the plurality of micromirrors are movably arranged at the different orientations on the pattern converting element. In other words, an orientation of a given micromirror can be changed in a requisite manner. In such a case, the given micromirror of the pattern converting element directs the light beam incident thereon towards the target surface, in a dynamic manner. Optionally, the plurality of micromirrors are associated with a plurality of actuators, wherein the at least one processor is configured to control the plurality of actuators to move the plurality of micromirrors for directing the light beam towards the target surface in the dynamic manner. In this regard, each of the plurality of actuators is individually controlled by the at least one processor to move each of the plurality of micromirrors individually. Thus, the at least one processor control the plurality of actuators by way of different actuation signals as required. It will be appreciated that when the plurality of micromirrors are movably arranged, the pattern converting element could dynamically convert the first pattern into the second pattern according to the user's gaze. Beneficially, in such a case, the second pattern mimicking a foveated rendering pattern of light spots could be accurately produced.

Optionally, a total number of micromirrors in the pattern converting element lies within a predefined threshold number from a total number of pixels in the at least one subframe. In some implementations, the total number of micromirrors is equal to the total number of pixels in the at least one subframe. Herein, the predefined threshold number is zero, and a given micromirror corresponds to a given pixel in the at least one subframe. In such a case, at least one ray of the light beam is incident upon the given (dedicated) micromirror of the pattern converting element, and is directed towards the target surface for producing a given light spot. In an example, the total number of micromirrors and the total number of pixels in the at least one subframe may be 125000. In other implementations, the total number of micromirrors is more than the total number of pixels in the at least one subframe. Herein, one or more micromirrors corresponds to a given pixel in the at least one subframe. In an example, the total number of micromirrors may be 130000 and the total number of pixels in the at least one subframe may be 125000, when the predefined threshold number is 10000. In yet other implementations, the total number of micromirrors is less than the total number of pixels in the at least one subframe. Herein, a given micromirror corresponds to one or more pixels in the at least one subframe. In an example, the total number of micromirrors may be 120000 and the total number of pixels in the at least one subframe may be 125000, when the predefined threshold number is 5000.

In another embodiment, the pattern converting element comprises a transparent optical medium having at least one surface whose different portions have at least one of: different curvatures, different refractive indices. Optionally, in this regard, the pattern converting element is arranged to: receive the light beam from the at least one scanning mirror upon the at least one surface of the transparent optical medium; and direct the light beam to pass through the transparent optical medium towards the target surface. It will be appreciated that the different curvatures and/or the different refractive indices of the different portions of the at least one surface of the transparent optical medium facilitate in changing the optical path of the plurality of light rays of the light beam in a requisite manner when the light beam passes through the transparent optical medium towards the target surface. This is because the different curvatures and/or the different refractive indices define a direction in which the light beam is refracted and/or how the light beam is focused for facilitating in conversion of the first pattern to the second pattern. The light beam may be refracted and/or focused due to occurrence of refraction, convergence, divergence, or similar. The different curvatures of the different portions of the transparent optical medium refers to different surface geometries (such as planar, concave, convex, freeform, and the like) of the different portions. It will be appreciated that the transparent optical medium could be implemented as an optical device such as a lens, a prism, and the like.

In yet another embodiment, the pattern converting element is implemented as a Digital Light Processing (DLP®)-based element comprising a Digital Micromirror Device (DMD) and a DMD controller. The DMD directs the light beam (via reflection) towards the target surface, whilst converting the first pattern into the second pattern. The term "Digital Micromirror Device" refers to a specialized high-speed MEMS-based equipment used to direct (namely, steer) light beams. The DMD is movable (via tilting, rotation, or similar) in two dimensions, or in three dimensions to direct the light beam towards the target surface. Optionally, the at least one processor is configured to control the DMD controller for moving the DMD. Optionally, the DMD comprises a plurality of microscopic mirrors. In such a case, the DMD controller can individually control the plurality of microscopic mirrors, using electrical drive signals. The plurality of microscopic mirrors could be arranged in a rectangular 2D grid arrangement, a polygonal pattern, a circular pattern arrangement, or similar.

Optionally, the at least one subframe comprises N subframes, wherein the at least one processor is configured to:
  divide the first image frame into the N subframes; and
  control the at least one first light source and the at least one scanning mirror to draw the N subframes over the pattern converting element.

Optionally, when dividing the first image frame into the N subframes, the at least one processor is configured to employ a sampling process for sampling the first image frame into the N subframes. The sampling process could be an arbitrary sampling process, a pseudorandom sampling process, or a predefined sampling process. As an example, the sampling process may be a predefined sampling process, wherein a plurality of pixels in the first image frame are arranged as a 2D grid. In this example, pixels located at even rows and even columns in the 2D grid may be sampled to obtain pixels in a first subframe, pixels located at odd rows and odd columns in the 2D grid may be sampled to obtain pixels in a second subframe, pixels located at even rows and odd columns in the 2D grid may be sampled to obtain pixels in a third subframe, and so on.

Optionally, each subframe amongst the N subframes, when drawn, comprises the plurality of light spots arranged in the first pattern. Optionally, the pattern converting element converts first patterns corresponding to the N subframes into second patterns. It will be appreciated that each time a given subframe amongst the N subframes is drawn, the pattern converting element is controlled to convert a first pattern corresponding to the given subframe into a given form of the second pattern. This produces the output image having the spatially-variable resolution. In such a case, all the N subframes of the first image frame are collectively perceived as the output image. The output image constitutes all the light spots of all the second patterns. Such a manner of producing the output image (i.e., when a total number of perceived light spots is greater than a total number of micromirrors) facilitates in providing an apparent spatial super-resolution within the display apparatus. It will be appreciated that when the at least one subframe comprises the N subframes, the output image having the apparent spatial super-resolution could be optionally produced using a reasonable number of micromirrors in the pattern converting element. As an example, when the at least one subframe comprises 8 subframes, and a total number of required light spots in the output image are 1 million, the number of micromirrors required in the pattern converting element would be 125000.

Optionally, the at least one processor is configured to draw the N subframes in a random order. In such a case, an order of producing the N subframes (constituting the output image) over the target surface would also be random or near random. The technical benefit of drawing the N subframes in the random order is that it avoids repetitiveness, and no flicker like sensation or jerk is noticed by the user when viewing the output image. Resultantly, this would enhance a viewing experience for the user viewing the output image. As an example, the at least one subframe comprises 4 subframes A1, A2, A3, and A4. Herein, a given random order of drawing the 4 subframes A1-A4 may be: A1, A4, A3, A2; A4, A1, A3, A2; A3, A2, A4, A1; or similar.

Optionally, the display apparatus further comprises gaze-tracking means and at least one light steering element arranged on an optical path between the pattern converting element and the target surface, wherein the at least one processor is configured to:
  process gaze-tracking data, obtained from the gaze-tracking means, to determine a gaze direction of a user;
  determine, based on the gaze direction, a drawing area on the target surface over which the output image is to be produced; and
  control the at least one light steering element to direct the light beam to produce the output image over the drawing area.

Herein, the term "gaze-tracking means" refers to a specialized equipment for detecting and/or following gaze of the user, when the HMD in operation is worn by the user. The gaze-tracking means could be implemented as contact lenses with sensors, cameras monitoring a position of a pupil of the user's eye, and the like. Such gaze-tracking means are well-known in the art. Notably, the gaze-tracking means is configured to collect the gaze-tracking data. It will be appreciated that the gaze-tracking data is collected repeatedly by the gaze-tracking means, as the gaze of the user's eyes keeps changing whilst he/she uses the HMD. An up-to-date gaze-tracking data (indicative of the gaze direction of the user) allows for producing an up-to-date gaze-contingent output image. The term "gaze direction" refers to a direction in which the user's eye is gazing. The gaze direction may be represented by a gaze vector. Optionally, when processing the gaze-tracking data, the at least one processor is configured to employ at least one of: an image processing algorithm, a feature extraction algorithm, a data processing algorithm. Other suitable algorithm(s) can also be employed. It will be appreciated that the gaze-tracking system and the at least one light steering element are communicably coupled to the at least one processor wirelessly, or in a wired manner.

The term "drawing area" refers to a gaze-contingent area within the target surface. The drawing area is an area within the target surface whereat the gaze direction of the user is directed (namely, focused) when the user views the output image. In such a case, the output image that is to be produced over the drawing area would be perceived with high visual acuity by foveas of the user's eyes. Therefore, the at least one processor is configured to determine a location of the drawing area within the target surface. Optionally, the at least one processor is configured to map the gaze direction of the user onto the target surface to determine the location of the drawing area. Notably, the location of the drawing area changes according to a change in the gaze direction of the user (namely, due to a movement of the user's eyes).

Throughout the present disclosure, the term "light steering element" refers to a specialized component that is controllable to direct (namely, steer) the light beam over the drawing area for producing the output image over the drawing area. Due to the arrangement of the at least one light steering element, the light beam is directed from the pattern converting element towards the at least one light steering element, wherefrom the light beam is directed towards the target surface. In such a case, the at least one light steering element allows for adjusting the optical path of the light beam, thereby, facilitating in steering the light beam over the drawing area of the target surface. The at least one light steering element could be implemented as a MEMS mirror, a MOEMS mirror, and the like. It will be appreciated that the at least one light steering element is controlled to direct the light beam over the drawing area of the target surface, according to the gaze direction of the user. Such a manner of controlling the at least one light steering element to dynamically directing the light beam over the drawing area allows for the implementing active foveation within the display apparatus. Beneficially, in such a case, a foveated rendering pattern of light spots could be accurately produced over the drawing area.

Optionally, the at least one processor is configured to control an orientation and/or a movement of the at least one light steering element for directing the light beam over the drawing area. Controlling the orientation of the at least one light steering element means controlling tilting and/or rotation of the at least one light steering element. Optionally, the at least one light steering element is associated with at least one steering actuator for controlling the orientation and/or movement of the at least one light steering element. Optionally, in this regard, the at least one processor is configured to: generate an offset signal based upon the location of the drawing area relative to an entire area of the target surface; and control the at least one light steering element using the offset signal, to direct the light beam for producing the output image over the drawing area. Herein, the term "offset signal" refers to a control signal that allows the at least one steering actuator to control the orientation and/or movement of the at least one light steering element the at least one light steering element such that the light beam reflected from the at least one light steering element is incident at (the location of) the drawing area. Optionally, the offset signal comprises at least one of: an x-axis offset, a y-axis offset. As an example, the offset signal may comprise both the x-axis offset (namely, a horizontal axis offset) and the y-axis offset (namely, a vertical axis offset) to align the at least one light steering element horizontally and vertically, respectively. In such an example, the location of the drawing area relative to the entire area of the target surface may be at a top right area of the target surface.

Optionally, the at least one processor is configured to switch off or dim the at least one first light source to selectively prevent the light beam from being incident on an area of the target surface outside the drawing area. Notably, when an extent of steering provided by the at least one light steering element is improper, the light beam would be at least partially directed on the area of the target surface that lies outside the drawing area. Therefore, the at least one processor is configured to switch off or dim the at least one first light source such that the light beam would not be incident outside the drawing area, therefore, would be imperceptible to the user. In such a case, the light beam is only incident within the drawing area. This would enable a projection of the light beam incidenting upon the target surface to have an angular extent greater than an angular extent of the drawing area. So only a part of the projection would be shown when using the at least one light steering element. Switching off the at least one first light source means that the at least one first light source is turned off, and no light beam is emitted by the at least one first light source, whereas dimming the at least one first light source means that an intensity (namely, brightness) of the light beam is drastically reduced so that it would be imperceptible (even upon incidenting outside the drawing area) to the user. Beneficially, selectively preventing the light beam from being incident on the area of the target surface that lies outside the drawing area facilitates in improving the viewing experience for the user. It will be appreciated that switching off or diming the at least one first light source also facilitates in saving electrical energy used in driving the at least one first light source. Notably, operation of the at least one scanning mirror would be unchanged while switching off or diming the at least one first light source, in order to avoid unwanted oscillations, or ripples, of the at least one scanning mirror.

Optionally, the at least one processor is configured to apply a distortion-correcting transformation to the first image frame prior to drawing the at least one subframe, based on the gaze direction of the user. In this regard, since the location of the drawing area changes according to a change in the gaze direction of the user, the at least one light steering element is tilted and/or rotated to change its orientation for steering the light beam towards the (gaze-contingent) drawing area. Due to this tilting and/or rotation, the output image produced over the drawing area may appear distorted (for example, from a perspective of a pose of the user's eye). The term "pose" encompasses both a position and an orientation. Therefore, the at least one processor applies the distortion-correcting transformation to the first image frame when controlling the at least one scanning mirror, according to the tilt and/or the rotation of the at least one light steering element. Beneficially, upon applying the distortion-correcting transformation to the first image frame, the output image produced over the drawing area is free from any distortion, and the user is provided with a required view of the output image. Optionally, when applying the distortion-correcting transformation, the at least one processor is configured to employ at least one of: a transformation, a distortion-correcting model. Optionally, the transformation is one of: a geometric transformation, a colour transformation, a blending transformation. Optionally, the distortion-correcting model is one of: a Brown-Conrady model, a rational function lens distortion model, a field of view (FOV) model, a division model, a cubic rational polynomial model. Such transformations and distortion-correcting models are well-known in the art.

The present disclosure also relates to the method as described above. Various embodiments and variants disclosed above apply mutatis mutandis to the method.

Optionally, the method further comprises generating the first image frame from an input image, based on a transformation function representing a reverse transformation from the second pattern to the first pattern.

Optionally, the at least one subframe comprises N subframes, wherein the method further comprises:
  dividing the first image frame into the N subframes; and
  controlling the at least one first light source and the at least one scanning mirror to draw the N subframes over the pattern converting element.

Optionally, in the method, the N subframes are drawn in a random order.

Optionally, in the method, the pattern converting element comprises a plurality of micromirrors that are arranged at different orientations and have different curvatures.

Optionally, in the method, the pattern converting element comprises a transparent optical medium having at least one surface whose different portions have at least one of: different curvatures, different refractive indices.

Optionally, in the method, the pattern converting element is implemented as a Digital Light Processing (DLP®)-based element comprising a Digital Micromirror Device (DMD) and a DMD controller.

Optionally, the method further comprises:
processing gaze-tracking data, obtained from gaze-tracking means, to determine a gaze direction of a user;
determining, based on the gaze direction, a drawing area on the target surface over which the output image is to be produced; and
controlling at least one light steering element, arranged on an optical path between the pattern converting element and the target surface, to direct the light beam to produce the output image over the drawing area.

Optionally, the method further comprises switching off or dimming the at least one first light source to selectively prevent the light beam from being incident on an area of the target surface outside the drawing area.

Optionally, the method further comprises applying a distortion-correcting transformation to the first image frame prior to drawing the at least one subframe, based on the gaze direction of the user.

DETAILED DESCRIPTION OF THE DRAWINGS

Referring to FIG. 1, illustrated is an architecture of a display apparatus 100, in accordance with an embodiment of the present disclosure. The display apparatus 100 comprises at least one first light source per eye (depicted as first light sources 102 and 104), at least one scanning mirror per eye (depicted as scanning mirrors 106 and 108), a pattern converting element per eye (depicted as pattern converting elements 110 and 112), and at least one processor (depicted as a processor 114).

Figure 2:
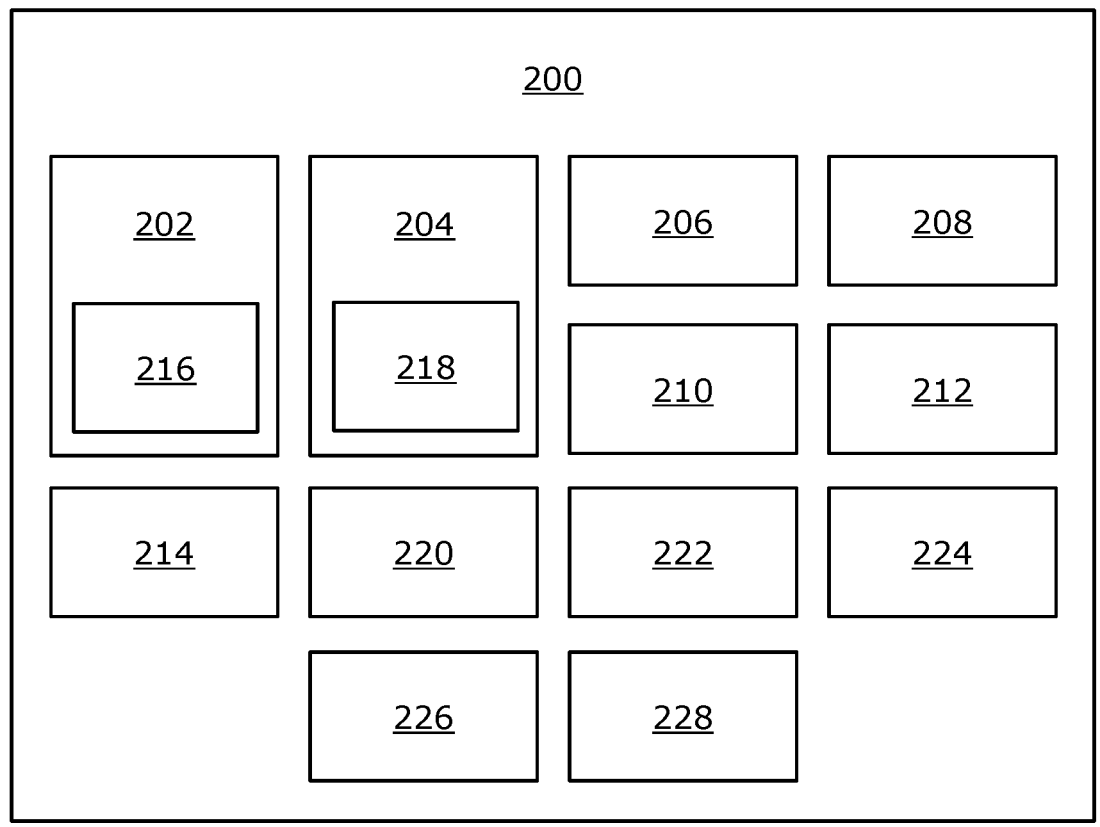

Referring to FIG. 2, illustrated is an architecture of a display apparatus 200, in accordance with an embodiment of the present disclosure. The display apparatus 200 comprises at least one first light source per eye (depicted as first light sources 202 and 204), at least one scanning mirror per eye (depicted as scanning mirrors 206 and 208), a pattern converting element per eye (depicted as pattern converting elements 210 and 212), and at least one processor (depicted as a processor 214). The first light sources 202 and 204 are shown to comprise beam modulators 216 and 218). The display apparatus 200 further comprises gaze-tracking means 220 and at least one light steering element per eye (depicted as light steering elements 222 and 224). The display apparatus 200 further comprises at least one second light source per eye (depicted as second light sources 226 and 228).

It may be understood by a person skilled in the art that the FIGS. 1 and 2 are simplified architectures of different display apparatuses 100 and 200 for sake of clarity, which should not unduly limit the scope of the claims herein. The person skilled in the art will recognize many variations, alternatives, and modifications of embodiments of the present disclosure.

Figure 3A:
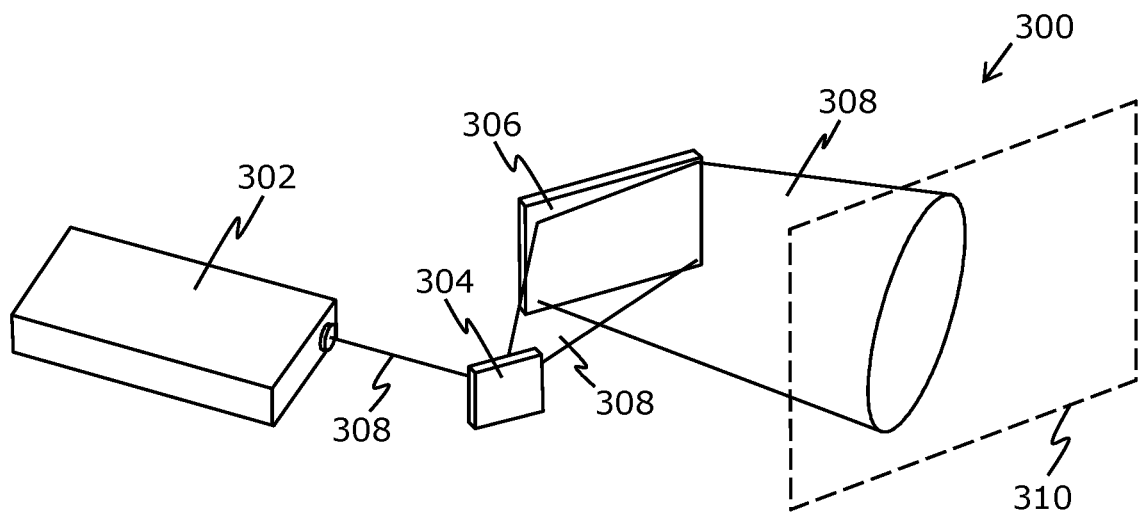
FIGS. 3A and 3B illustrate exemplary implementations of a display apparatus, in accordance with different embodiments of the present disclosure.
Figure 3B:
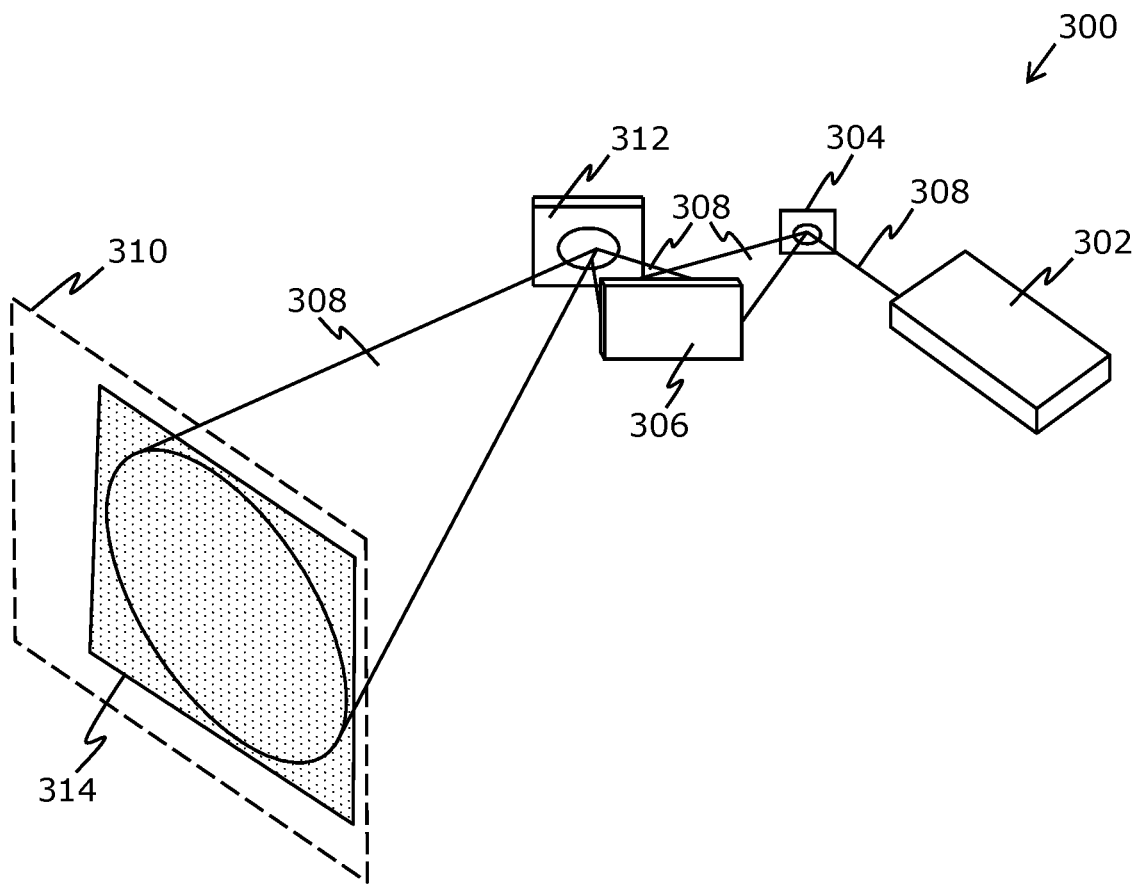

Referring to FIGS. 3A and 3B, illustrated are exemplary implementations of a display apparatus 300, in accordance with different embodiments of the present disclosure. The display apparatus 300 comprises at least one first light source per eye (depicted as a first light source 302), at least one scanning mirror per eye (depicted as a scanning mirror 304), a pattern converting element per eye (depicted as a pattern converting element 306), and at least one processor (not shown). The at least one processor controls the first light source 302 to emit a light beam 308, whilst controlling the scanning mirror 304 to draw at least one subframe of a first image frame over the pattern converting element 306. The scanning mirror 304 is arranged to reflect the light beam 308 towards the pattern converting element 306 and is controlled to sweep the light beam 308 over the pattern converting element 306. The at least one subframe, when drawn, comprises a plurality of light spots arranged in a first pattern. The pattern converting element 306 is employed to direct the light beam 308 incident thereon towards a target surface 310, whilst converting the first pattern of the plurality of light spots into a second pattern, thereby producing on the target surface 310 an output image having a spatially-variable resolution.

In FIG. 3B, the display apparatus 300 further comprises gaze-tracking means (not shown) and at least one light steering element (depicted as a light steering element 312) arranged on an optical path between the pattern converting element 306 and the target surface 310. The light steering element 312 is controlled to direct the light beam 308 to produce the output image over a drawing area 314 (depicted as a dotted hatched area) on the target surface 310, the drawing area 314 being determined based on a gaze direction of a user (not shown).

It may be understood by a person skilled in the art that the FIGS. 3A and 3B are simplified exemplary implementations of the display apparatus 300 for sake of clarity, which should not unduly limit the scope of the claims herein. The person skilled in the art will recognize many variations, alternatives, and modifications of embodiments of the present disclosure.

Referring to FIGS. 4A and 4B, FIG. 4A illustrates how a pattern converting element 402 converts first patterns of light spots constituting subframes of a first image frame into second patterns, while FIG. 4B illustrates a perceived arrangement of light spots of an output image, in accordance with an embodiment of the present disclosure.

In FIG. 4A, column C1 depicts N subframes of the first image frame, wherein each subframe, when drawn over the pattern converting element 402 (depicted in column C2), comprises the light spots (depicted, for example, as 64 light spots) arranged in the first patterns (depicted as 2D 8*8 grid patterns). Next, column C3 depicts second patterns corresponding to the N subframes, wherein central portions of the second patterns have a higher density of the light spots than peripheral portions of the second patterns. The pattern converting element 402 converts the first patterns into different forms of the second patterns (as depicted in column C2 by different random second patterns for each subframe of the N subframes), thereby producing the output image of FIG. 4B.

In FIG. 4B, all the (drawn) N subframes of the first image frame are collectively perceived as the output image. The output image constitutes all the light spots of all the second patterns of column C3 of FIG. 4A, such that the output image has a spatially-variable resolution.

Referring to FIG. 5, illustrated is a simplified exemplary arrangement of perceived light spots of an output image, in accordance with an embodiment of the present disclosure. Herein, the perceived light spots are shown to have spatially varying densities and sizes, which results in a spatially-variable resolution of the output image. As shown for sake of simplicity only, the perceived light spots comprise 14 dense overlapping light spots of same size in a centre of the output image, 10 non-overlapping light spots of slightly larger size and lesser density in between the centre and a periphery of the output image, and 7 sparse non-overlapping light spots of largest size in the periphery of the output image. In reality, the output image would have a much larger total number of perceived light spots.

Figure 6:
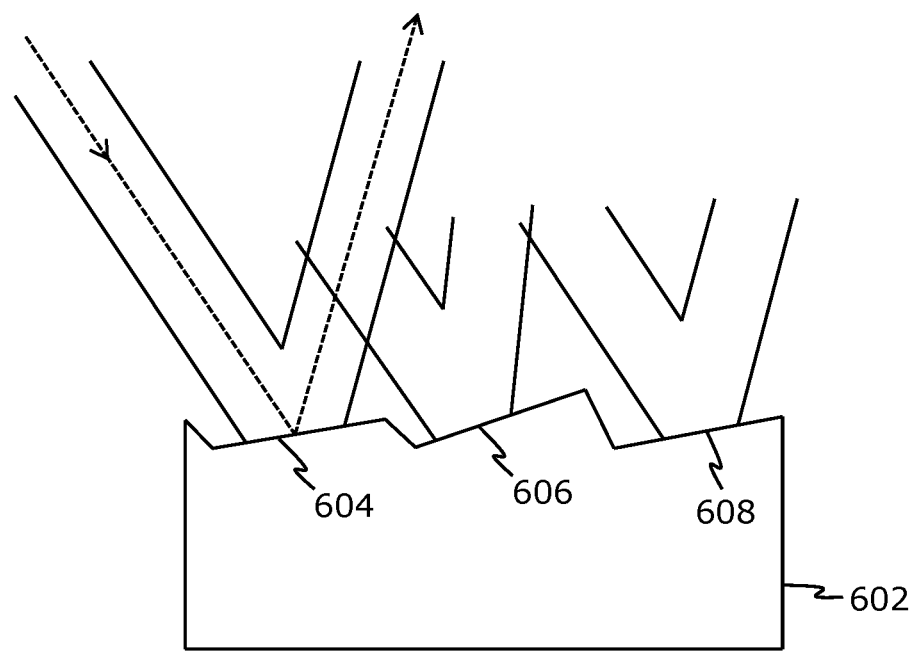
FIG. 6 illustrates how light rays of a light beam are incident upon and directed by a pattern converting element, in accordance with an embodiment of the present disclosure.

Referring to FIG. 6, illustrated is how light rays of a light beam are incident upon and directed by a pattern converting element 602, in accordance with an embodiment of the present disclosure. For sake of simplicity, the pattern converting element 602 is shown to comprise 3 micromirrors 604, 606, and 608 that are arranged at different orientations and have different curvatures. The light beam from at least one scanning mirror (not shown) is incident upon the micromirrors 604, 606, and 608, and is directed towards the target surface (for example, at different angles) after reflecting from the micromirrors 604, 606, and 608. For sake of simplicity, an exemplary optical path of a ray of the light beam (depicted as a dashed arrow) incident upon and reflecting from the micromirror 604 is shown.

Figure 7A:
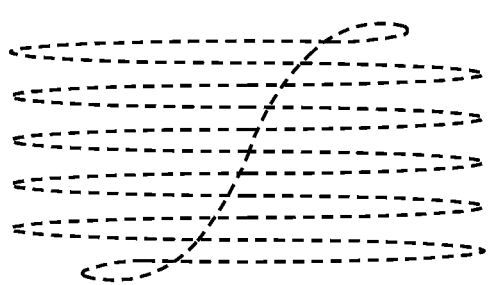
Figure 7B:
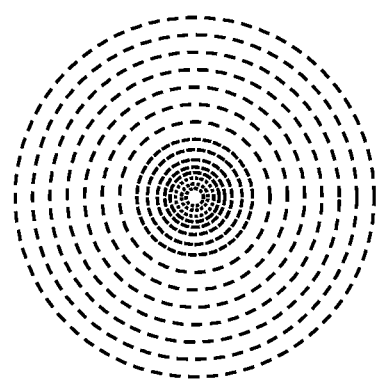
FIG. 7B illustrates a human eye resolution pattern, in accordance with an embodiment of the present disclosure.

Referring to FIGS. 7A and 7B, FIG. 7A illustrates an exemplary scanning pattern according to which a scanning mirror (not shown) sweeps a light beam over a pattern converting element (not shown), while FIG. 7B illustrates a human eye resolution pattern, in accordance with an embodiment of the present disclosure.

In FIG. 7A, the exemplary scanning pattern is a raster pattern. Herein, the scanning mirror sweeps the light beam over the pattern converting element according to the raster pattern to draw at least the subframe (not shown) over the pattern converting element. The at least one subframe, when drawn, comprises a plurality of light spots arranged in a first pattern (for example, such as a 2D grid pattern). The exemplary scanning pattern could also be a Lissajous pattern, a spiral pattern, or similar.

In FIG. 7B, the human eye resolution pattern is a concentric pattern representing resolution characteristics of human visual system. Herein, the human eye resolution pattern has a spatially varying resolution which is highest in a central region and reduces on going away from a centre of said pattern to a periphery of said pattern. A second pattern of light spots, for example, having a varying density of light spots and a varying size of the light spots, optionally mimics the human eye resolution pattern.

Figure 8:
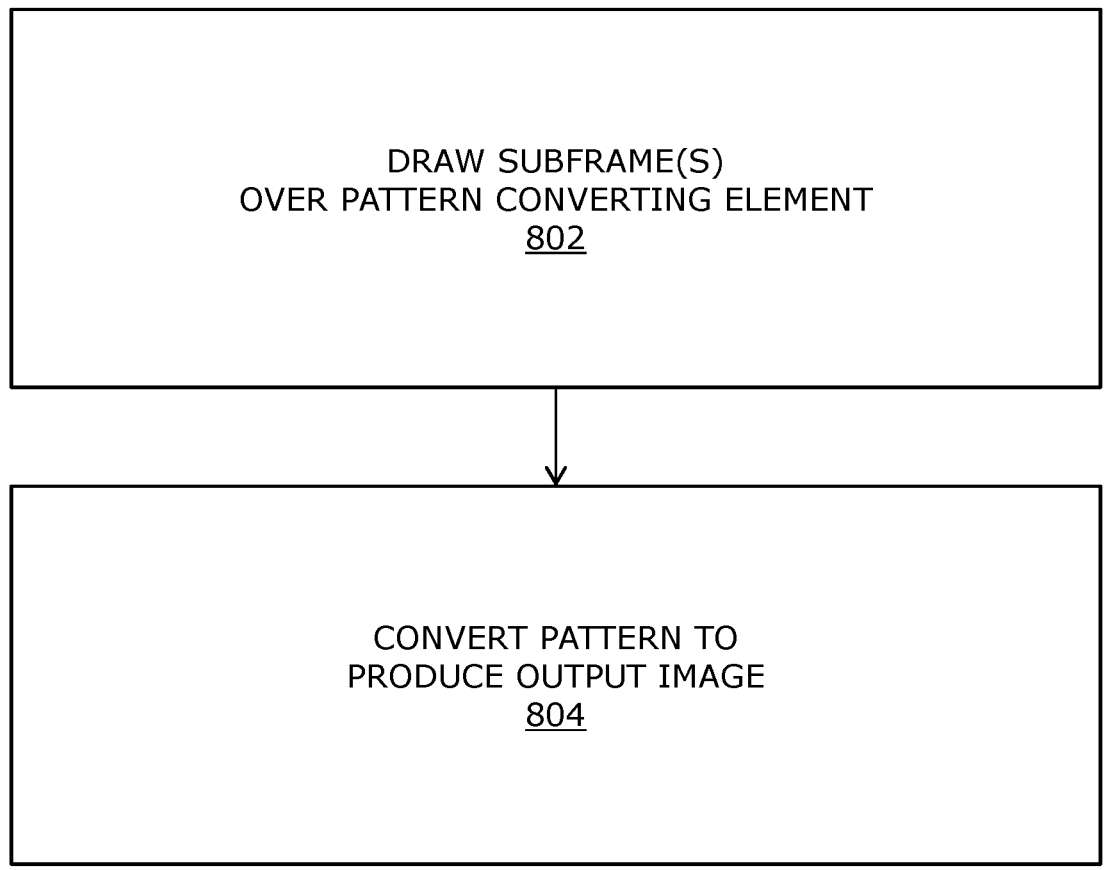
FIG. 8 illustrate steps of a method, in accordance with an embodiment of the present disclosure.

Referring to FIG. 8, illustrated are steps of a method, in accordance with an embodiment of the present disclosure. At step 802, at least one first light source is controlled to emit a light beam, whilst controlling at least one scanning mirror to draw at least one subframe of a first image frame over a pattern converting element, wherein the at least one subframe, when drawn, comprises a plurality of light spots arranged in a first pattern. At step 804, the pattern converting element is employed to direct the plurality of light spots incident thereon towards a target surface, whilst the first pattern of the plurality of light spots is converted into a second pattern, thereby producing on the target surface an output image having a spatially-variable resolution.

The steps 802 and 804 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
at least one first light source per eye;
at least one scanning mirror per eye;
a pattern converting element per eye; and
at least one processor configured to control the at least one first light source to emit a light beam whilst controlling the at least one scanning mirror to draw at least one subframe of a first image frame over the pattern converting element, wherein the at least one subframe, when drawn, comprises a plurality of light spots arranged in a first pattern,
wherein the pattern converting element is employed to direct the light beam incident thereon towards a target surface whilst converting the first pattern of the plurality of light spots into a second pattern, thereby producing on the target surface an output image having a spatially-variable resolution.

2. The display apparatus of claim 1, wherein a central portion of the second pattern has a higher density of light spots than a peripheral portion of the second pattern.

3. The display apparatus of claim 1, wherein the at least one processor is configured to generate the first image frame from an input image, based on a transformation function representing a reverse transformation from the second pattern to the first pattern.

4. The display apparatus of claim 1, wherein the at least one subframe comprises N subframes, wherein the at least one processor is configured to:
divide the first image frame into the N subframes; and
control the at least one first light source and the at least one scanning mirror to draw the N subframes over the pattern converting element.

5. The display apparatus of claim 4, wherein the at least one processor is configured to draw the N subframes in a random order.

6. The display apparatus of claim 1, wherein the pattern converting element comprises a plurality of micromirrors that are arranged at different orientations and have different curvatures.

7. The display apparatus of claim 6, wherein a total number of micromirrors in the pattern converting element lies within a predefined threshold number from a total number of pixels in the at least one subframe.

8. The display apparatus of claim 1, wherein the pattern converting element comprises a transparent optical medium having at least one surface whose different portions have at least one of: different curvatures, different refractive indices.

9. The display apparatus of claim 1, wherein the pattern converting element is implemented as a Digital Light Processing (DLP)-based element comprising a Digital Micromirror Device (DMD) and a DMD controller.

10. The display apparatus of claim 1, further comprising gaze-tracking means and at least one light steering element arranged on an optical path between the pattern converting element and the target surface, wherein the at least one processor is configured to:
process gaze-tracking data, obtained from the gaze-tracking means, to determine a gaze direction of a user;
determine, based on the gaze direction, a drawing area on the target surface over which the output image is to be produced; and control the at least one light steering element to direct the light beams to produce the output image over the drawing area.

11. The display apparatus of claim 10, wherein the at least one processor is configured to switch off or dim the at least one first light source to selectively prevent the light beam from being incident on an area of the target surface outside the drawing area.

12. The display apparatus of claim 10, wherein the at least one processor is configured to apply a distortion-correcting transformation to the first image frame prior to drawing the at least one subframe, based on the gaze direction of the user.

13. A method of displaying, the method comprising:
controlling at least one first light source to emit a light beam, whilst controlling at least one scanning mirror to draw at least one subframe of a first image frame over a pattern converting element, wherein the at least one subframe, when drawn, comprises a plurality of light spots arranged in a first pattern; and
employing the pattern converting element to direct the light beam incident thereon towards a target surface, whilst converting the first pattern of the plurality of light spots into a second pattern, thereby producing on the target surface an output image having a spatially-variable resolution.

14. The method of claim 13, further comprising generating the first image frame from an input image, based on a transformation function representing a reverse transformation from the second pattern to the first pattern.

15. The method of claim 13, wherein the at least one subframe comprises N subframes, wherein the method further comprises:
dividing the first image frame into the N subframes; and
controlling the at least one first light source and the at least one scanning mirror to draw the N subframes over the pattern converting element.

16. The method of claim 15, wherein the N subframes are drawn in a random order.

17. The method of claim 13, wherein the pattern converting element comprises a plurality of micromirrors that are arranged at different orientations and have different curvatures.

18. The method of claim 13, wherein the pattern converting element comprises a transparent optical medium having at least one surface whose different portions have at least one of: different curvatures, different refractive indices.

19. The method of claim 13, wherein the pattern converting element is implemented as a Digital Light Processing (DLP)-based element comprising a Digital Micromirror Device (DMD) and a DMD controller.

20. The method of claim 13, further comprising:
processing gaze-tracking data, obtained from gaze-tracking means, to determine a gaze direction of a user;
determining, based on the gaze direction, a drawing area on the target surface over which the output image is to be produced; and
controlling at least one light steering element, arranged on an optical path between the pattern converting element and the target surface, to direct the light beam to produce the output image over the drawing area.

21. The method of claim 20, further comprising switching off or dimming the at least one first light source to selectively prevent the light beam from being incident on an area of the target surface outside the drawing area.

22. The method of claim 20, further comprising applying a distortion-correcting transformation to the first image frame prior to drawing the at least one subframe, based on the gaze direction of the user.

* * * * *